United States Patent Office 3,094,526
Patented June 18, 1963

3,094,526
10-[(3- AND 4-HYDROXY-1-PIPERIDYL) LOWER-ALKYL] PHENOTHIAZINES
Bernard L. Zenitz, Colonie, and Lewis P. Albro, North Greenbush, N.Y., assignors to Sterling Drug Inc., New York, N.Y., a corporation of Delaware
No Drawing. Filed Aug. 23, 1957, Ser. No. 689,020
9 Claims. (Cl. 260—243)

This invention relates to new phenothiazinylalkyl amines and to methods for the preparation thereof.

10-[(1-piperidyl)lower-alkylene]phenothiazines unsubstituted in the piperidine ring are known. The invention resides in the concept of such known types of phenothiazines wherein the piperidine ring is substituted by a hydroxy or hydroxy-lower-alkyl radical, or by said radicals when esterified, and salts thereof, whereby new and useful compounds are obtained. The phenothiazine nucleus may thus be unsubstituted or substituted by one or more substituents of the nature commonly known in phenothiazine derivatives such as the chlorpromazine type. A preferred group of such substituents for our purpose are halogen, lower-alkyl, and lower-alkoxy radicals.

A preferred aspect of the invention relates to compounds having the formula

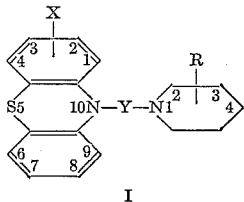

I wherein X represents hydrogen or halogen, Y represents a lower-alkylene radical, and R represents a hydroxy, acyloxy, hydroxy-lower-alkyl or acyloxy-lower-alkyl radical. The halogen atom can be any of the four halogens, fluorine, chlorine, bromine or iodine, and can be in any of the four available positions in the benzene ring, although the 2-position is a preferred one.

In the above general Formula I, the alkylene bridge Y has from two to about five carbon atoms, may be straight or branched, and is such that the nitrogen atoms of the phenothiazine and piperidine moieties are separated by at least two carbon atoms. Thus Y includes such groups as ethylene, $CH_2CH_2$; propylene, $CH_2CH_2CH_2$; 1 - methylethylene, $CH(CH_3)CH_2$; 2 - methylethylene, $CH_2CH(CH_3)$; butylene, $CH_2CH_2CH_2CH_2$; 1 - methylpropylene, $CH(CH_3)CH_2CH_2$; pentylene, $$CH_2CH_2CH_2CH_2CH_2$$

and the like. A particularly preferred group of compounds is that in which Y is propylene, $CH_2CH_2CH_2$.

In the above formula I, the group R represents a hydroxy, acyloxy, hydroxy-lower-alkyl or acyloxy-lower-alkyl radical. The hydroxy and acyloxy radicals can be in the 3- or 4-position of the piperidine ring, and the hydroxy-lower-alkyl and acyloxy-lower alkyl radicals can be in the 2-, 3- or 4-position of the piperidine ring, i.e., in any of the three possible positions. A particularly preferred group of compounds is that in which R is in the 4-position of the piperidine ring. The acyloxy group is one derived from a hydrocarbon carboxylic acid, preferably having from one to about eight carbon atoms, and thus includes such groups as formyloxy, acetoxy, propionyloxy, butyryloxy, isobutyryloxy, caproyloxy, benzoyloxy, p-toluyloxy, and the like.

When R represents a hydroxy-lower-alkyl or acyloxy-lower-alkyl radical, it stands for a lower-alkyl radical, which can be straight or branched and contains from one to about five carbon atoms, and bears a hydroxy or acyloxy group attached to a carbon atom in any available position in the side chain respective to the piperidine ring. The acyloxy portions of the acyloxy-lower-alkyl radicals are of the same type as those described above. Thus R includes such radicals as hydroxymethyl, acetoxymethyl, 1-hydroxyethyl, 2-hydroxyethyl, 2-propionyloxyethyl, 3-hydroxypropyl, 5-hydroxypentyl, and the like.

The compounds of the invention are prepared by reacting a phenothiazine with a hydroxypiperidine, hydroxy-lower-alkyl-piperidine, or ester thereof in which either the phenothiazine or the piperidine bears attached to nitrogen a halo-lower-alkyl radical. A preferred method comprises heating a hydroxypiperidine or hydroxy-lower-alkylpiperidine with a 10-phenothiazinyl-lower-alkyl halide at a temperature between about 50° C. and 150° C. in the presence of an acid-acceptor. The reaction is preferably carried out in an organic solvent, inert under the conditions of the reaction, such as anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, e.g., sodium carbonate, potassium carbonate, sodium acetate, sodium alkoxides, sodium amide, and the like. The acid-acceptor can also be in the form of an excess quantity of hydroxypiperidine or hydroxy-lower-alkylpiperidine.

The reaction of a 10-phenothiazinyl-lower-alkyl halide with a hydroxypiperidine or hydroxy-lower-alkylpiperidine takes place under relatively mild conditions, a preferred, specific method comprising heating the reactants in boiling ethanol solution in the presence of anhydrous sodium carbonate. The reaction of a phenothiazine with an N-(halo-lower-alkyl)-hydroxypiperidine or -hydroxy-lower-alkylpiperidine requires somewhat more vigorous conditions, a preferred method comprising heating the reactants in boiling xylene in the presence of sodium amide.

The compounds of Formula I wherein R represents an acyloxy or acyloxy-lower-alkyl radical are preferably produced by esterification of the corresponding compounds wherein R represents a hydroxy or hydroxy-lower-alkyl radical, for instance, by heating the hydroxy compound with the appropriate acid anhydride or acid halide in pyridine solution. It is possible, however, to prepare the acyloxy compounds directly by condensation of a 10-phenothiazinyl-lower-alkyl halide with an acyloxy-piperidine or acyloxy-lower-alkylpiperidine, although it is preferable to use an excess of the piperidine reactant as the acid-acceptor rather than sodium carbonate or the like in order to avoid partial cleavage of the ester linkage.

The intermediate 10-phenothiazinyl-lower-alkyl halides are a known class of compounds. They can be prepared by reacting the 10-lithio derivative of phenothiazine or of a substituted phenothiazine with the appropriate halo-lower-alkyl p-toluenesulfonate. The substituted phenothiazines are in turn prepared by known methods, e.g., see Charpentier et al., Compt. rend. 235, 59–60 (1952), Evans et al., J. Chem. Soc. 1935, 1263–4 (1935), and Massie, Chem. Rev. 54, 797 (1954).

The acid-addition or quaternary ammonium salts of the compounds of Formula I are water-soluble and are the form in which the compounds are conveniently prepared for use physiologically. Pharmacologically acceptable salts are salts whose anions are innocuous to the animal organism in effective doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

Although pharmacologically acceptable salts are preferred, those having toxic anions are also useful. All acid-addition salts are useful as intermediates in purification of the free bases, and toxic acid-addition and quaternary ammonium salts are also useful as intermediates in preparing pharmacologically acceptable salts by ion exchange procedures.

The structures of the compounds of the invention have been established by chemical analysis and by the processes for their preparation, which can only lead to compounds of the assigned structures.

The following examples will further illustrate the invention, without the latter being limited thereto.

*Example 1*

*10-[3-(4-hydroxy-1-piperidyl)propyl]phenothiazine* [I; X is H, Y is $(CH_2)_3$, R is 4-OH].—A mixture of 8.3 g. (0.030 mole) of 3-(10-phenothiazinyl)propyl chloride, 3.33 g. (0.033 mole) of 4-hydroxypiperidine and 3.2 g. of anhydrous sodium carbonate in 100 ml. of absolute ethanol was refluxed with stirring for twenty-four hours. An additional 1.6 g. of sodium carbonate was then added, and the mixture was refluxed for twenty-four hours longer. Another 1.6 g. of sodium carbonate was added, and the mixture was refluxed again for twenty-four hours. The reaction mixture was filtered, the solid inorganic salts were washed with ethanol, and the combined filtrate and washings were concentrated to dryness. The residue was dissolved in benzene, and the benzene solution was extracted with water and with dilute hydrochloric acid. The hydrochloric acid solutions were made basic with ammonium hydroxide and extracted with chloroform. The chloroform extracts were washed with water, dried over anhydrous calcium sulfate and concentrated. The residue was dissolved in ether and treated with an ether solution of hydrogen chloride. Upon cooling there separated 5.55 g. of crystalline hydrochloride, M.P. 196.5–197.5° C. After several recrystallizations from ethanol there was obtained 4.55 g. of 10-[3-(4-hydroxy-1-piperidyl)propyl]phenothiazine hydrochloride, M.P. 210.5–213.5° C. (corr.).

*Analysis.*—Calcd. for $C_{20}H_{24}N_2OS \cdot HCl$: N, 7.44; S, 8.51. Found: N, 7.33; S, 8.52.

10-[3 - (4 - hydroxy-1-piperidyl)propyl]phenothiazine hydrochloride, when administered subcutaneously to mice produced strong potentiation of the hexobarbital sleeping time, its activity being about equal to that of chlorpromazine, that is, it increased the mean sleeping time of the control value of about thirty minutes to sixty-seventy mintues at a dose level of 1.0 mg./kg. of body weight. The effective dose ($ED_{50}$) of 10-[3-(4-hydroxy-1-piperidyl)propyl]phenothiazine hydrochloride in inducing sleep in mice to which 40 mg./kg. of hexobarbital was administered, was $1.4 \pm 0.3$ mg./kg. as compared to $1.55 \pm 0.10$ mg./kg. for chlorpromazine.

By replacement of the 3-(10-phenothiazinyl)propyl chloride in the preceding preparation by a molar equivalent amount of 3-(2-fluoro-10-phenothiazinyl)propyl chloride, 2-(2-bromo-10-phenothiazinyl)ethyl chloride, 4-(2-iodo-10-phenothiazinyl)butyl chloride, 2-(1-chloro-10-phenothiazinyl)-propyl chloride, 3-(4-chloro-10-phenothiazinyl)propyl chloride, 3 - (2 - methyl-10-phenothiazinyl)propyl chloride, or 3-(2-methoxy-10-phenothiazinyl)propyl chloride, there can be obtained, respectively, 2-fluoro-10-[3-(4-hydroxy - 1 - piperidyl)propyl]-phenothiazine [I; X is 2-F, Y is $(CH_2)_3$, R is 4-OH], 2-bromo-10-[2-(4-hydroxy-1-piperidyl)ethyl]phenothiazine [I; X is 2-Br, Y is $(CH_2)_2$, R is 4-OH], 2-iodo-10-[4-(4-hydroxy-1-piperidyl)butyl]phenothiazine [I; X is 2-I, Y is $(CH_2)_4$, R is 4-OH], 1-chloro-10-[2-(4-hydroxy-1-piperidyl)isopropyl]phenothiazine, [I; X is 1-Cl, Y is $CH(CH_3)CH_2$, R is 4-OH], 4-chloro-10-[3-(4-hydroxy-1-piperidyl)propyl]phenothiazine [I; X is 4-Cl, Y is $(CH_2)_3$, R is 4-OH], 2-methyl-10-[3-(4-hydroxy-1-piperidyl)propyl]phenothiazine [I; X is 2-$CH_3$, Y is $(CH_2)_3$, R is 4-OH], or 2-methoxy-10-[3-(4-hydroxy-1-piperidyl)propyl]-phenothiazine [I; X is 2-$OCH_3$, Y is $(CH_2)_3$, R is 4-OH].

By replacement of the 4-hydroxypiperidine in the preceding preparation by a molar equivalent amount of 4-(2 - hydroxyethyl)piperidine, or 4-(1 - hydroxyethyl)-piperidine, there can be obtained, respectively, 10-{3-[4-(2-hydroxyethyl)-1-piperidyl]propyl}phenothiazine [I; X is H, Y is $(CH_2)_3$, R is 4-$CH_2CH_2OH$], or 10-{3-[4-(1-hydroxyethyl)-1-piperidyl]propyl}phenothiazine [I; X is H, Y is $(CH_2)_3$, R is 4-CH(OH)$CH_3$].

10-[3-(4-hydroxy-1-piperidyl)propyl]phenothiazine can be reacted with hydrobromic acid, hydriodic acid, sulfuric acid, phosphoric acid, acetic acid, citric acid, tartaric acid, quinic acid, methyl iodide, methyl bromide, ethyl bromide, benzyl chloride, 2-chlorobenzyl chloride, or methyl p-toluenesulfonate to give the hydrobromide, hydriodide, sulfate (or bisulfate), phosphate (or acid phosphate), acetate, citrate (or acid citrate), tartrate (or bitartrate), quinate, methiodide, methobromide, ethobromide, benzochloride, 2-chlorobenzochloride, or metho-p-toluenesulfonate salts, respectively.

*Example 2*

*10-[2-(4-hydroxy-1 - piperidyl)ethyl]phenothiazine* [I; X is H, Y is $(CH_2)_2$, R is 4-OH] was prepared from 6.55 g. (0.025 mole) of 2-(10-phenothiazinyl)ethyl chloride, 2.77 g. (0.0275 mole) of 4-hydroxypiperidine and 5.25 g. (0.05 mole) of sodium carbonate in 100 ml. of ethanol according to the manipulative procedure described above in Example 1. The product was converted to the hydrochloride salt and recrystallized from an ethanol-ether mixture, giving 2.3 g. of 10-[2-(4-hydroxy - 1 - piperidyl)ethyl]phenothiazine hydrochloride, M.P. 233–236.5° C. (corr.).

*Analysis.*—Calcd. for $C_{19}H_{22}N_2OS \cdot HCl$: N, 7.72; S, 8.83. Found: N, 7.78; S, 8.75.

*Example 3*

*2-chloro-10-[3-(4-hydroxy-1 - piperidyl)propyl]phenothiazine* [I; X is 2-Cl, Y is $(CH_2)_3$, R is 4-OH] was prepared from 12.4 g. (0.040 mole) of 3-(2-chloro-10-phenothiazinyl)propyl chloride, 4.4 g. (0.044 mole) of 4-hydroxypiperidine and 8.4 g. of sodium carbonate in 150 ml. of ethanol according to the manipulative procedure described above in Example 1. The product was isolated in the form of the free base and recrystallized from an ethyl acetate-hexane mixture, giving 9.9 g. of 2-chloro-10-[3-(4 - hydroxy - 1 - piperidyl)propyl]phenothiazine, M.P. 94–97.5° C. (corr.).

*Analysis.*—Calcd. for $C_{20}H_{23}ClN_2OS$: N, 7.47; S, 8.55. Found: N, 7.17; S, 8.47.

2-chloro-10-[3-(4-hydroxy-1 - piperidyl)propyl]phenothiazine in acid addition salt form was found to be about five times as active as chlorpromazine in potentiating hexobarbital in mice.

Example 4

2-chloro-10-[3-(4-acetoxy - 1 - piperidyl)propyl]phenothiazine [I; X is 2-Cl, Y is $(CH_2)_3$, R is 4-OCOCH$_3$].—A mixture of 5 g. of 2-chloro-10-[3-(4-hydroxy-1-piperidyl)propyl]phenothiazine, 10 ml. of acetic anhydride and 25 ml. of pyridine was heated on a steam bath for ten minutes. The reaction mixture was allowed to stand for about fifteen hours at room temperature and then heated for two hours longer on a steam bath. Ethanol (10 ml.) was added and the reaction mixture was concentrated in vacuo. The residue was dissolved in 200 ml. of dilute acetic acid, and the solution decolorized with activated charcoal and then made basic with dilute potassium carbonate solution. The gummy product was extracted with chloroform, and the chloroform extracts were washed with water and concentrated. The residue was dissolved in 250 ml. of boiling hexane and filtered. The filtrate was concentrated to dryness and the residue converted to the hydrochloride salt by treatment with an ether solution of hydrogen chloride. There was thus obtained 5.2 g. of 2-chloro-10-[3-(4-acetoxy-1-piperidyl)propyl]phenothiazine hydrochloride, M.P. 203.5–206° C. (corr.).

*Analysis.*—Calcd. for $C_{22}H_{25}ClN_2O_2S·HCl$: C, 58.27; H, 5.78; N, 6.18. Found: C, 58.17; H, 5.97; N, 6.12.

2-chloro-10-[3-(4-acetoxy - 1 - piperidyl)propyl]phenothiazine hydrochloride was found to be about twice as active as chlorpromazine in potentiating hexobarbital in mice.

If formic acid is added to the reaction mixture in the preceding preparation and the pyridine omitted, there can be obtained 2-chloro-10-[3-(4-formyloxy-1-piperidyl)-propyl]phenothiazine hydrochloride.

By replacement of the acetic anhydride in the preceding preparation by a molar equivalent amount of propionic anhydride, caproyl chloride, benzoyl chloride, phenylacetyl chloride, or p-toluyl chloride, there can be obtained, respectively, 2-chloro-10-[3-(4-propionyloxy-1-piperidyl)-propyl]phenothiazine hydrochloride, 2-chloro-10-[3-(4-caproyloxy-1-piperidyl)propyl]phenothiazine hydrochloride, 2-chloro-10-[3-(4-benzoyloxy-1-piperidyl)propyl]-phenothiazine hydrochloride, 2-chloro-10-[3-(4-phenylacetoxy-1-piperidyl)propyl]phenothiazine hydrochloride, or 2-chloro-10-[3-(4-toluyloxy-1-piperidyl)propyl]phenothiazine hydrochloride.

Example 5

3-chloro-10-[3-(4-hydroxy - 1-piperidyl)propyl]phenothiazine [I; X is 3-Cl, Y is $(CH_2)_3$, R is 4-OH] was prepared from 7.7 g. (0.025 mole) of 3-(3-chloro-10-phenothiazinyl)propyl chloride, 2.7 g. (0.027 mole) of 4-hydroxypiperidine and 6.5 g. of sodium carbonate in 150 ml. of ethanol according to the manipulative procedure described above in Example 1. The product was isolated in the form of the free base and recrystallized from an ethyl acetate-hexane mixture, giving 3.9 g. of 3-chloro-10-[3-(4 - hydroxy - 1 - piperidyl)propyl]phenothiazine, M.P. 102.5–104.5° C. (corr.).

*Analysis.*—Calcd. for $C_{20}H_{23}ClN_2OS$: N, 7.5; Cl, 9.5. Found: N, 7.44; Cl, 9.18.

Example 6

2-chloro-10-[3-(3-hydroxy - 1-piperidyl)propyl]phenothiazine [I; X is 2-Cl, Y is $(CH_2)_3$, R is 3-OH] was prepared from 15.5 g. (0.05 mole) of 3-(2-chloro-10-phenothiazinyl)propyl chloride, 5.5 g. (0.055 mole) of 3-hydroxypiperidine and 10.7 g. of sodium carbonate in 250 ml. of ethanol according to the manipulative procedure described above in Example 1. The product was isolated in the form of the hydrochloride salt and recrystallized from an ethanol-ether mixture, giving 12.8 g. of 2-chloro-10-[3-(3 - hydroxy - 1 - piperidyl)propyl]phenothiazine hydrochloride, M.P. 186.5–192° C. (corr.).

*Analysis.*—Calcd. for $C_{20}H_{23}ClN_2OS·HCl$: N, 6.81; Cl, 17.24. Found: N, 6.83; Cl, 17.53.

Example 7

10 - [3 - (3-hydroxy-1-piperidyl)propyl]phennothiazine [I; X is H, Y is $(CH_2)_3$, R is 3-OH] was prepared from 11.0 g. (0.040 mole) of 3-(10-phenothiazinyl)propyl chloride, 4.4 g. (0.044 mole) of 3-hydroxypiperidine and 8.4 g. of sodium carbonate in 200 ml. of ethanol according to the manipulative procedure described above in Example 1. The product was isolated in the form of the hydrochloride salt and recrystallized from an ethanol-ether mixture, giving 10-[3-(3-hydroxy-1-piperidyl)propyl]phenothiazine hydrochloride, M.P. 180–182.5° C. (corr.).

*Analysis.*—Calcd. for $C_{20}H_{24}N_2OS·HCl$: N, 7.44; S, 8.51. Found: N, 7.35; S, 8.25.

Example 8

2 - chloro - 10 - [3 - (4 - hydroxymethyl - 1 - piperidyl)propyl]phenothiazine [I; X is 2-Cl, Y is $(CH_2)_3$, R is 4-CH$_2$OH] was prepared from 9.3 g. (0.030 mole) of 3-(2-chloro-10-phenothiazinyl)propyl chloride, 3.8 g. (0.033 mole) of 4-hydroxymethylpiperidine and 6.3 g. of sodium carbonate in 200 ml. of ethanol according to the manipulative procedure described above in Example 1. The free base was recrystallized from a hexane-benzene mixture, giving 2-chloro-10-[3-(4-hydroxymethyl-1-piperidyl)propyl]phenothiazine, M.P. 99–101° C. (corr.).

*Analysis.*—Calcd. for $C_{21}H_{25}ClN_2OS$: N, 7.20; S, 8.24. Found: N, 7.09; S. 8.21.

2 - chloro - 10 - [3 - (4 - hydroxymethyl - 1 - piperidyl)-propyl]phenothiazine in acid-addition salt form was found to be about four times as active as chlorpromazine in potentiating hexobarbital in mice.

Example 9

2 - chloro - 10 - [3 - (4 - acetoxymethyl - 1 - piperidyl)-propyl]phenothiazine [I; X is 2-Cl, Y is $(CH_2)_3$, R is 4-OCOCH$_3$] was prepared from 5 g. of 2-chloro-10-[3-(4-hydroxymethyl-1-piperidyl)propyl]phenothiazine and 5 ml. of acetic anhydride in 20 ml. of pyridine according to the manipulative procedure described above in Example 4. The product was isolated in the form of the free base and recrystallized from a hexane-benzene mixture giving 2-chloro-10-[3-(4-acetoxymethyl-1-piperidyl)propyl]phenothiazine, M.P. 67.5–69.5° C. (corr.).

*Analysis.*—Calcd. for $C_{23}H_{27}ClN_2O_2S$: N, 6.50; Cl, 8.23. Found: N, 6.48; Cl, 8.46.

Example 10

10 - {3 - [4 - (1 - hydroxyethyl) - 1 - piperidyl]propyl}-phenothiazine [I; X is H, Y is $(CH_2)_3$, R is

4-CH(OH)CH$_3$]

was prepared from 5.5 g. of 3-(10-phenothiazinyl)propyl chloride, 4.2 g. of 4-(1-hydroxyethyl)piperidine acetate [M.P. 155–161.5° C. (free base, M.P. 65–69° C.), prepared by catalytic hydrogenation of 4-acetylpyridine in acetic acid solution] and 6.4 g. of sodium carbonate in 200 ml. of ethanol according to the manipulative procedure described above in Example 1. The free base was recrystallized from a hexane-benzene mixture, giving 10-{3 - [4 - (1 - hydroxyethyl) - 1 - piperidyl]propyl}phenothiazine, M.P. 83–86° C. (corr.).

*Analysis.*—Calcd. for $C_{22}H_{28}N_2OS$: N, 7.60; S, 8.75. Found: N, 7.54; S, 8.88.

Pharmacological evaluation of the compounds of the invention in mice and dogs has demonstrated that they possess a variety of depressant actions on the central and autonomic nervous system, the cardiovascular system and the skeletal-muscular system. They lower the blood pressure and antagonize the pressor effects of epinephrine in dogs, they decrease the incidence of vomiting induced by apomorphine in dogs, they lower the rectal temperature in mice, and they potentiate the sleeping time in mice induced by ether, thiopental sodium, or hexobarbital sodium. These results indicate their usefulness as hypotensive agents, antinauseants, antipyretics, and sedatives. The compounds can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

We claim:

1. A member selected from the group consisting of (A) compounds of the formula

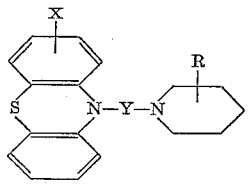

wherein X is a member of the group consisting of hydrogen, halogen, lower-alkyl, and lower-alkoxy; Y is lower-alkylene in which at least two carbon atoms separate the nitrogen atoms; R is a member of the group consisting of hydroxy in other than the 2-position of the piperidine ring, saturated hydrocarbon carboxylic acyloxy in other than the 2-position of the piperidine ring and containing from one to eight carbon atoms, and monocarbocyclic aroyloxy in other than the 2-position of the piperidine ring and containing from seven to eight carbon atoms; (B) pharmacologically acceptable acid-addition salts thereof; and (C) pharmacologically acceptable lower-alkyl, lower-alkenyl, and monocarbocyclic aryl-lower-alkyl quaternary ammonium salts thereof.

2. A pharmacologically acceptable acid-addition salt of a compound having the formula

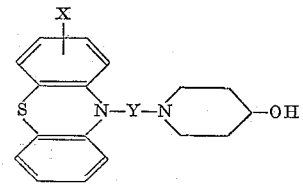

wherein X represents halogen and Y represents lower-alkylene in which at least two carbon atoms separate the nitrogen atoms.

3. A pharmacologically acceptable acid-addition salt of a compound having the formula

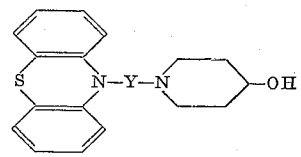

wherein Y represents lower-alkylene in which at least two carbon atoms separate the nitrogen atoms.

4. A pharmacologically acceptable acid-addition salt of 10-[3-(4-hydroxy-1-piperidyl)propyl]phenothiazine.

5. A pharmacologically acceptable acid-addition salt of 2 - chloro -10 - [3 - (4 - hydroxy - 1 - piperidyl)propyl]-phenothiazine.

6. A pharmacologically acceptable acid-addition salt of 3 - chloro - 10 - [3 - (4 - hydroxy - 1 - piperidyl)propyl]-phenothiazine.

7. A pharmacologically acceptable acid-addition salt of 2 - chloro - 10 - [3 - (3 - hydroxy - 1 - piperidyl)propyl]-phenothiazine.

8. 10 - [3 - (4 - hydroxy - 1 - piperidyl)propyl]phenothiazine hydrochloride.

9. 2 - chloro - 10 - [3 - (3 - hydroxy - 1 - piperidyl)propyl]-phenothiazine hydrochloride.

References Cited in the file of this patent

UNITED STATES PATENTS

| 2,534,235 | Cusic | Dec. 19, 1950 |
| 2,534,237 | Cusic | Dec. 19, 1950 |
| 2,645,640 | Charpentier | July 14, 1953 |
| 2,676,971 | Cusic | Apr. 27, 1954 |
| 2,766,235 | Cusic | Oct. 9, 1956 |
| 2,838,505 | Zenitz | June 10, 1958 |
| 2,943,086 | Yale et al. | June 28, 1960 |